(12) United States Patent
Kong

(10) Patent No.: US 8,459,827 B2  
(45) Date of Patent: Jun. 11, 2013

(54) TEST DEVICE USING LIGHT PROJECTION TO TEST ADHERENCE OF ELECTRICAL DEVICE

(75) Inventor: Li-Na Kong, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 244 days.

(21) Appl. No.: 13/113,084

(22) Filed: May 23, 2011

(65) Prior Publication Data
US 2012/0250300 A1 Oct. 4, 2012

(30) Foreign Application Priority Data

Mar. 29, 2011 (CN) .......................... 2011 1 0076678

(51) Int. Cl.
*F21L 4/00* (2006.01)

(52) U.S. Cl.
USPC ................... 362/190; 362/296.1; 362/311.12

(58) Field of Classification Search
USPC .................................. 362/190, 311.12, 296.1
See application file for complete search history.

(56) References Cited

U.S. PATENT DOCUMENTS

2011/0222271 A1* 9/2011 Liu .............................. 362/157
2012/0007619 A1* 1/2012 Zhu et al. ...................... 324/717

* cited by examiner

*Primary Examiner* — Evan Dzierzynski
(74) *Attorney, Agent, or Firm* — Altis Law Group, Inc.

(57) ABSTRACT

A test device is used for projecting light into a to-be-tested product. The product includes a sidewall, the sidewall defines an opening, and the opening communicates with an internal space of the product. The test device includes a collimated light source and a support element. The collimated light source is used for emitting collimated light into the internal space through the opening. The support element supports the collimated light source. An included angle between the collimated light and the sidewall is about 5 degrees.

8 Claims, 6 Drawing Sheets

TEST DEVICE USING LIGHT PROJECTION TO TEST ADHERENCE OF ELECTRICAL DEVICE

BACKGROUND

1. Technical Field

The present disclosure relates to safety test devices, particularly to a test device that uses light projection to test adherence of an electrical device to known safety standards.

2. Description of Related Art

In most jurisdictions there are rules in place regarding the safety of electronic devices (e.g., computers).

One body of safety rules is formulated by the International Electrotechnical Commission (IEC) and is used here as an example. Regarding one IEC safety rule, in FIG. 6, only a sidewall 42 and a bottom wall 44 of a to-be-tested product 40 are shown. The sidewall 42 is connected with the bottom wall 44, and is substantially perpendicular to the bottom wall 44. An outer surface of the sidewall 42 is a plane. The sidewall 42 defines a rectangular opening 422. A diagonal of the opening 422 is L. The opening 422 communicates with an internal space of the product 40. According to safety rules, one test that should be performed is executed by first shining a collimated light beam through the opening 422. The light should project through the opening 422 so that an included angle between the outer surface of the sidewall 42 and the light beam is about 5 degrees. Then, the volume of space encompassed by the light beam should be inspected to ensure no hazardous voltage or hazardous energy level can be contacted in that area. The space is further limited by use of the measurement L. Where the distance L can be measured perpendicularly out from the inner surface of the sidewall 42 to the back of the beam delineates the bottom border of the space that should be kept free of electrical hazards. In other words the area below the delineation need not be free of hazardous voltage and energy levels.

In one test process, the product 40 is placed on a flat surface of a worktable, an operator manually holds a source to project at 5 degrees as described above, and then determines whether hazardous voltages or hazardous energy levels exist in the protected space. Doing this manually can lead to human error.

Therefore, it is desirable to provide a test device, which can overcome the above-mentioned limitations.

DETAILED DESCRIPTION

Figure 1:
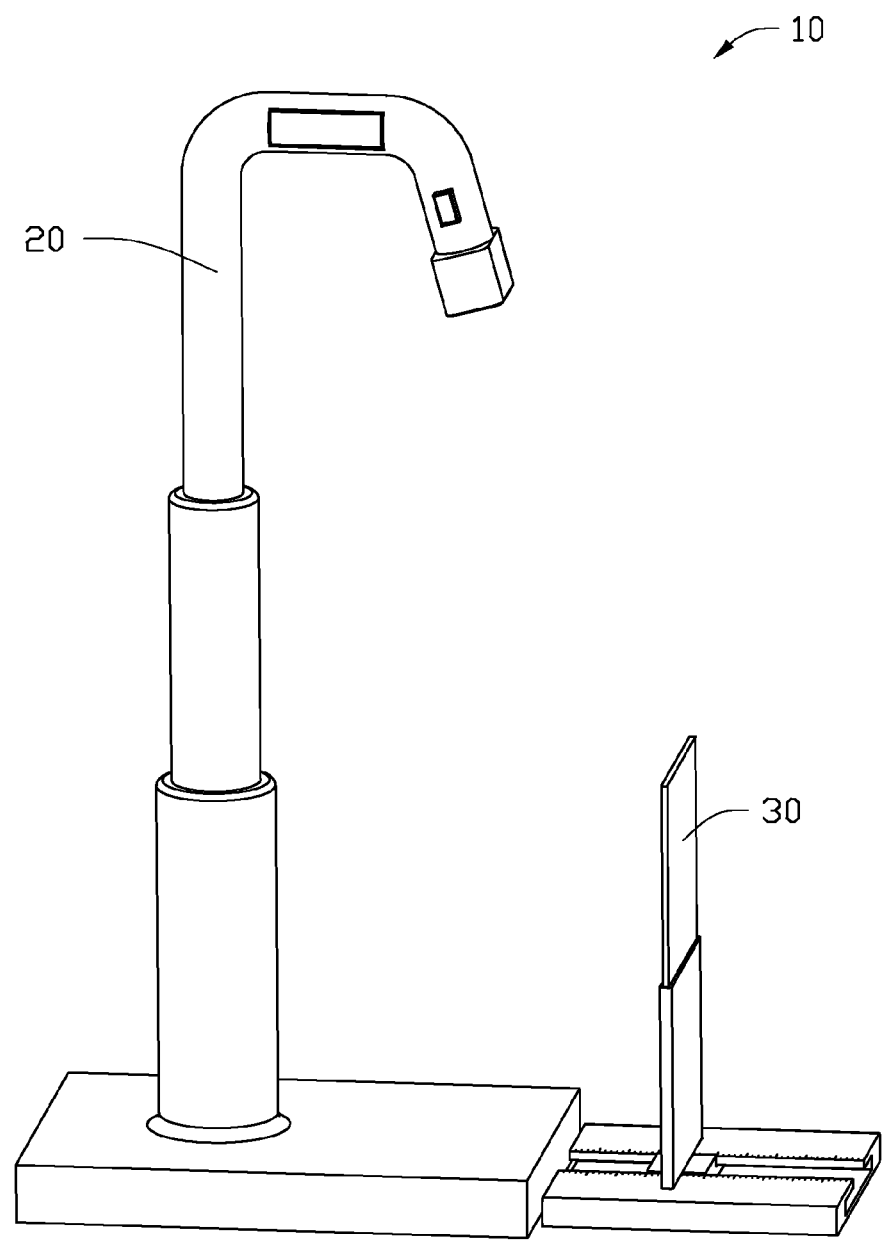
FIG. 1 is a perspective view of a test device according to one embodiment, the test device including a projection component and an auxiliary component.

Referring to FIG. 1, one embodiment of a test device 10 using light projection includes a projection component 20 and an auxiliary component 30.

Figure 2:
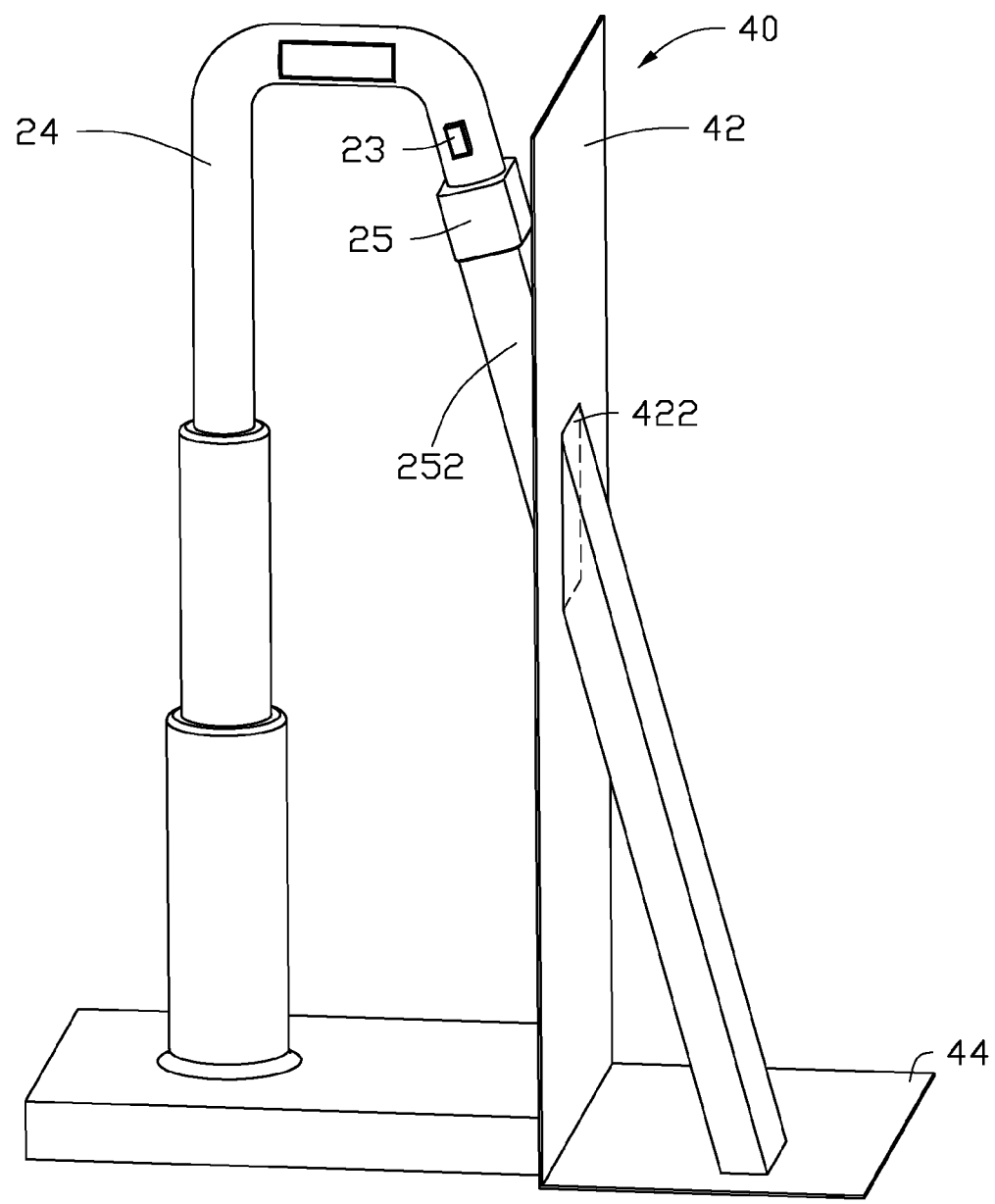
FIG. 2 is a perspective view of the test device of FIG. 1 in a first working state.

Referring to FIG. 2, the projection component 20 is configured for projecting light into a to-be-tested product 40. The product 40 can be, for example, a computer, or a projector. In the present embodiment, the product 40 is a computer. In the drawings, only a sidewall 42 and a bottom wall 44 of the product 40 are shown. The sidewall 42 is connected to the bottom wall 44, and is substantially perpendicular to the bottom wall 44. The sidewall 42 defines a rectangular opening 422 such as a vent or access port. A diagonal of the opening 422 is L. The opening 422 communicates with an internal space of the product 40.

Figure 3:
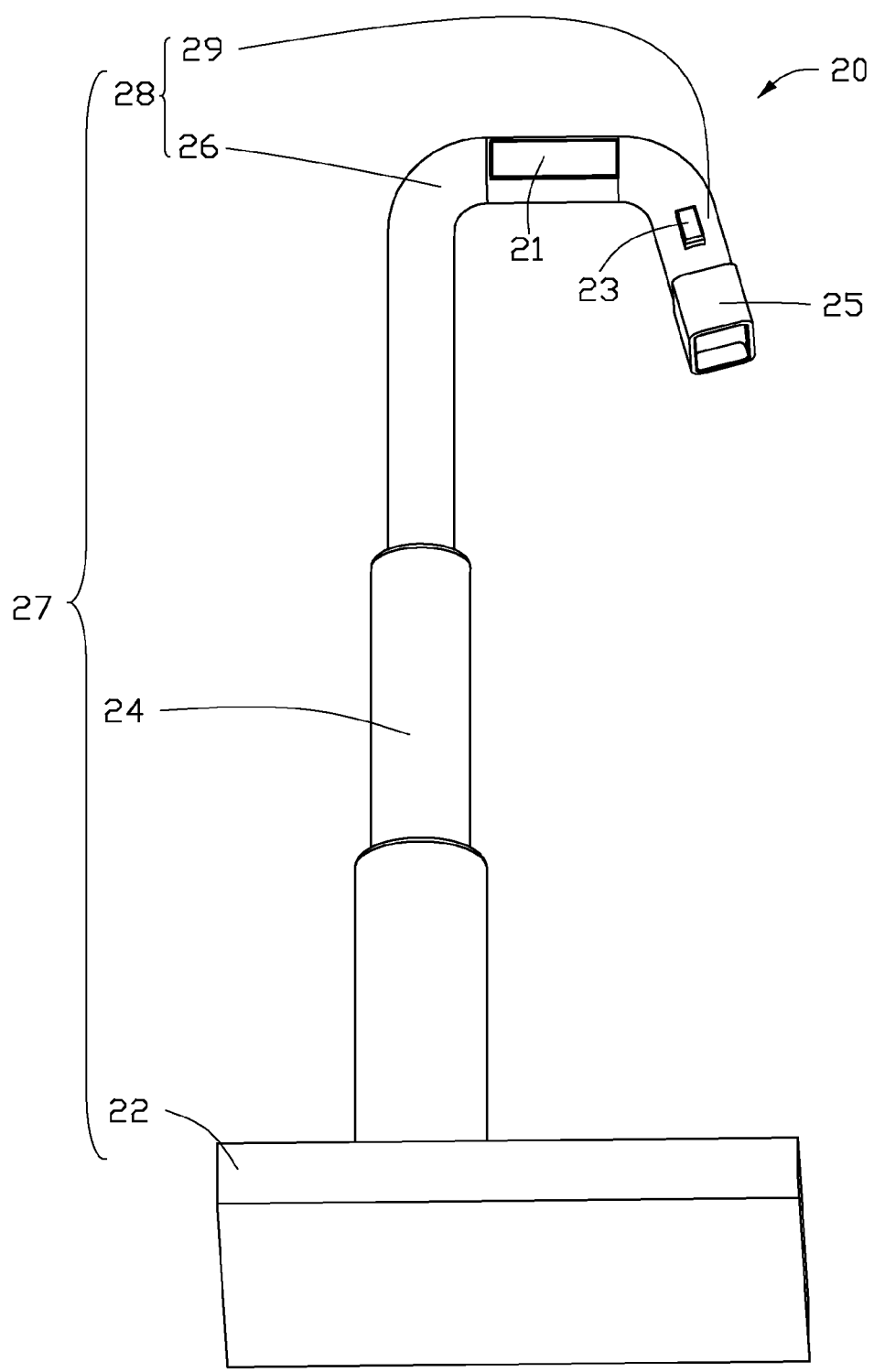
FIG. 3 is a perspective view of the projection component of FIG. 1.

Referring also to FIG. 3, the projection component 20 includes a collimated light source 25 and a support element 27 for supporting the collimated light source 25.

The collimated light source 25 is configured to emit collimated light beam 252 into the internal space of the product 40 via the opening 422 at a predetermined angle. The beam 252 at least fills the opening 422. An included angle formed between the beam 252 and the sidewall 42 is about 5 degrees. In the present embodiment, the collimated light source 25 is a laser light source.

The support element 27 includes a base 22, a telescopic tube 24, and a bent part 28. The base 22 is cuboid. One end of the telescopic tube 24 is fixed on the base 22, and the other end of the telescopic tube 24 is connected to the bent part 28. A central axis of the telescopic tube 24 is substantially parallel to the sidewall 42. The telescopic tube 24 is telescopic along its central axis. The bent part 28 is L-shaped, and includes a first connecting portion 26 and a second connecting portion 29. The first connecting portion 26 is substantially perpendicular to the telescopic portion 24. An included angle between the second connecting portion 29 and the central axis of the telescopic part 24 is about 5 degrees.

The collimated light source 25 is fixed on one end of the second connecting portion 29 away from the first connecting portion 26. The first connecting portion 26 includes a battery cabinet 21. The battery cabinet 21 is for receiving batteries, which supply power to the collimated light source 25. The second connecting portion 29 includes a switch for turning on/off the collimated light source 25.

Figure 4:
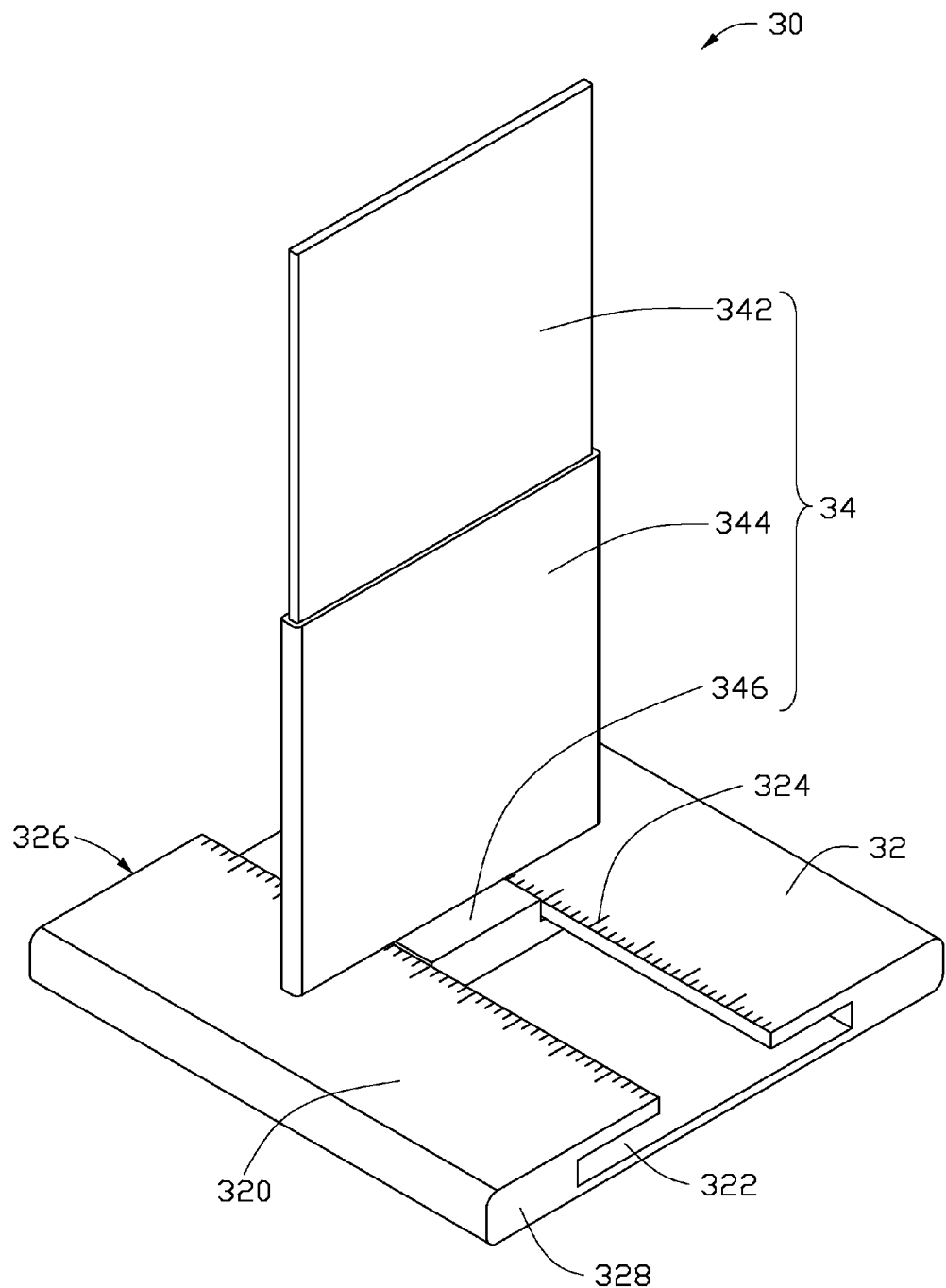
FIG. 4 is a perspective view of the auxiliary component of FIG. 1.

Referring to FIG. 4, the auxiliary component 30 includes a substrate 32 and a telescopic plate 34 perpendicularly formed on the substrate 32.

The substrate 32 includes a first side surface 326, a second side surface 328, and a surface connected between the first side surface 326 and the second side surface 328. The first side surface 326 is opposite to the second side surface 328. The substrate 32 defines a strip-shaped recess 322 in the surface 320, extending from the first side surface 326 to the second side surface 328.

The telescopic plate 34 includes an upper plate 342, a lower plate 344, and a sliding part 346 from top to bottom in the order written. The upper plate 342 is capable of moving up and down relative to the lower plate 344. The sliding part 346 engages in the strip-shaped recess 322, and is slidable along the strip-shaped recess 322. The substrate 32 includes a scale 324 formed on the surface 320. The scale 324 is graduated marks indicating a distance between the telescopic plate 34 and the first side surface 326.

The operation of the test device 10 will now be described with reference to the drawings.

First, referring to FIG. 2, the product 40 is provided.

Second, the projection component 20 is placed outside of the product 40 in such a manner that the sidewall 42 is in contact with the side surface of the base 22. The sidewall 42 is parallel to the central axis of the telescopic tube 24.

Third, the switch 23 is turned on, a length of the telescopic tube 24 is adjusted so that the beam 252 emitted by the collimated light source 25 can pass through the opening 422 and project into the internal space of the product 40.

Fourth, a volume of space encompassed by the beam 252 in the product 40 is observed by an operator, and it is determined whether hazardous voltage or hazardous energy level exists in the volume of space using, for example, a voltmeter by the operator. It is known to one skilled in the art how to measure and determine the hazardous voltage and the hazardous energy level, and is accordingly omitted here.

Fifth, if no hazardous voltage or hazardous energy level exists, the opening 422 conforms to the related safety rules, and the test for the opening 422 is finished; if a hazardous voltage or hazardous energy level exists, the opening 422 will be further tested using the auxiliary component 30.

Figure 5:
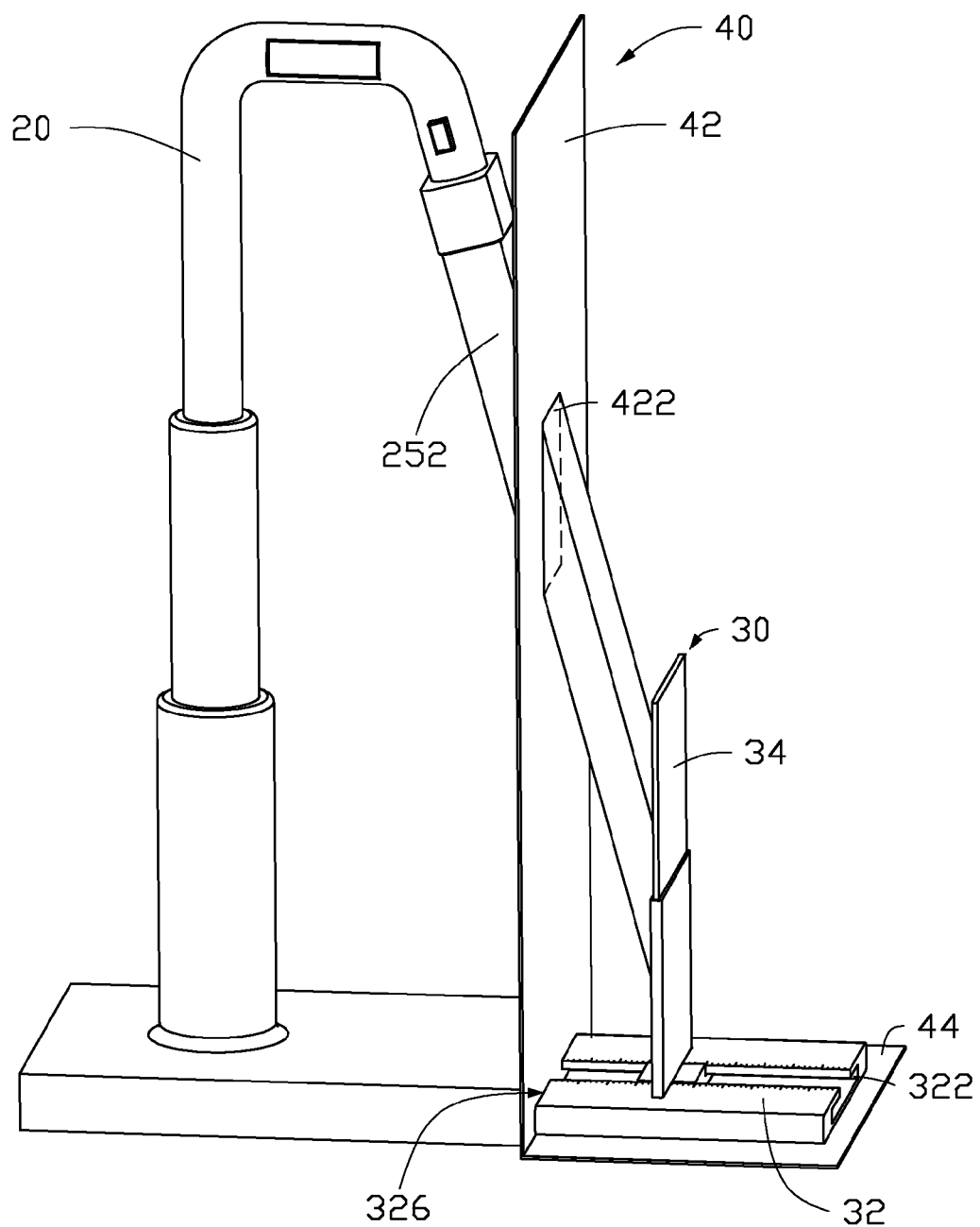
FIG. 5 is a perspective view of the projection component of FIG. 1 in a second working state.
Figure 6:
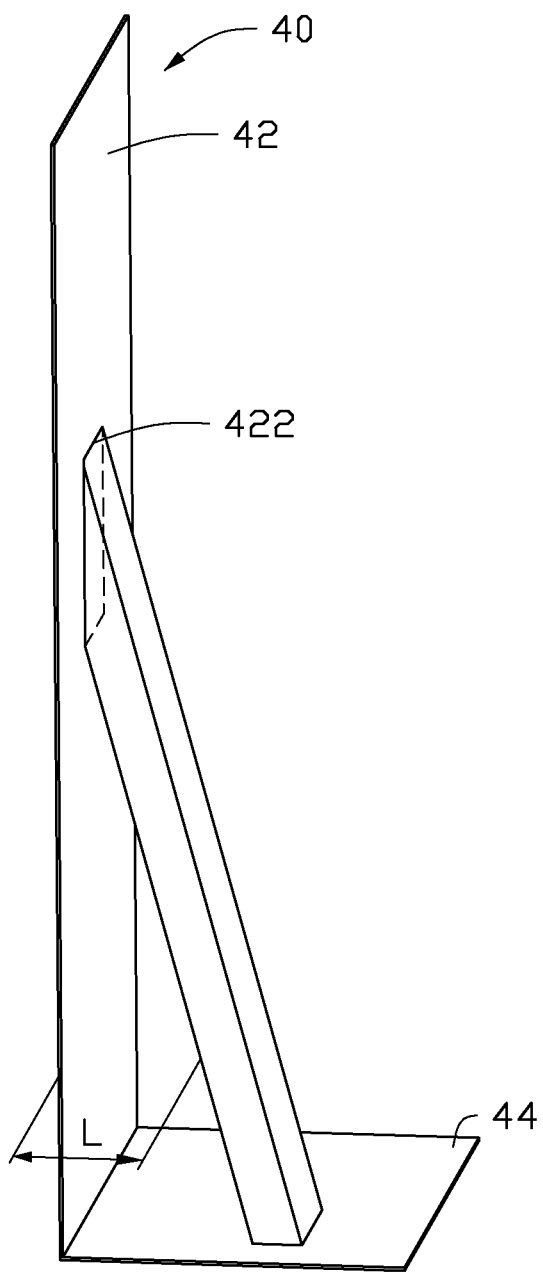
FIG. 6 is a perspective view of a product being tested.

Sixth, referring to FIG. 5, the auxiliary component 30 is placed inside the product 40 in such a manner that the first side surface 326 contacts the sidewall 42. The telescopic plate 34 is parallel to the sidewall 42. The telescopic plate 34 is moved along the strip-shaped recess 322 until a distance between the telescopic plate 34 and the sidewall 42 is L.

Seventh, it is determined whether hazardous voltage or hazardous energy levels exist in the volume of space encompassed by the beam 252 in the product 40 between the telescopic plate 34 and the sidewall 42 by the operator.

It is noteworthy that other openings (not shown) of the product 40 can be tested employing the above method.

While various embodiments have been described, it is to be understood that the disclosure is not limited thereto. To the contrary, various modifications and similar arrangements (as would be apparent to those skilled in the art), are also intended to be covered. Therefore, the scope of the appended claims should be accorded the broadest interpretation so as to encompass all such modifications and similar arrangements.

What is claimed is:

1. A test device for projecting light into a to-be-tested product, the product comprising a sidewall, the sidewall defining an opening, the opening communicating with an internal space of the product, the test device comprising:
   a support element;
   a collimated light source supported by the support element and configured for emitting collimated light into the internal space through the opening, wherein an included angle between the collimated light and the sidewall is about 5 degrees.

2. The test device of claim 1, wherein the support element comprises a base, a telescopic tube, and a bent part; one end of the telescopic tube is fixed on the base, a central axis of the telescopic tube is substantially parallel to the sidewall, the telescopic tube is telescopic along the central axis of the telescopic tube; one end of the bent part is connected with the telescopic tube, and the collimated light source is mounted on the other end of the bent part.

3. The test device of claim 2, wherein the bent part comprises a switch for turning on/off the collimated light source.

4. The test device of claim 2, wherein the bent part comprises a battery cabinet for receiving batteries, which supply power to the collimated light source.

5. The test device of claim 1, wherein the collimated light source is a laser.

6. The test device of claim 1, wherein the base is a cuboid.

7. The test device of claim 1, wherein the collimated light fills the opening.

8. The test device of claim 1, further comprising:
   a substrate, the substrate comprising a first side surface, a second side surface, and a surface connected between the first side surface and the second side surface, the first side surface being opposite to the second side surface, the substrate defining a strip-shaped recess in the surface extending from the first side surface to the second side surface; and
   a telescopic plate, the telescopic plate comprising an upper plate, a lower plate, and a sliding part, the upper plate being capable of moving up and down relative to the lower plate, the sliding part engaging in the strip-shaped recess, and being capable of sliding along the strip-shaped recess, the substrate comprising scales positioned on the surface, the scales being configured for indicating a distance between the telescopic plate and the first side surface.

* * * * *